United States Patent
Helle et al.

(10) Patent No.: US 7,915,762 B2
(45) Date of Patent: Mar. 29, 2011

(54) METHOD FOR CONTROLLING A CLUSTER OF WIND TURBINES CONNECTED TO A UTILITY GRID

(75) Inventors: Lars Helle, Suldrup (DK); John Godsk Nielsen, Hornslet (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/437,371

(22) Filed: May 7, 2009

(65) Prior Publication Data

US 2009/0234510 A1 Sep. 17, 2009

Related U.S. Application Data

(63) Continuation of application No. PCT/DK2007/000489, filed on Nov. 8, 2007.

(30) Foreign Application Priority Data

Nov. 8, 2006 (DK) .................................. 2006 01455

(51) Int. Cl.
*H02J 3/38* (2006.01)
*F03D 7/00* (2006.01)

(52) U.S. Cl. ....................................................... 307/87
(58) Field of Classification Search ...................... 307/87
See application file for complete search history.

(56) References Cited

U.S. PATENT DOCUMENTS

| | | | |
|---|---|---|---|
| 3,156,828 A | 11/1964 | Hopper, Jr. et al. | |
| 5,225,712 A | 7/1993 | Erdman | |
| 6,420,796 B1 * | 7/2002 | Lagerwey | 290/44 |
| 6,810,339 B2 * | 10/2004 | Wills | 702/65 |
| 7,002,260 B2 * | 2/2006 | Stahlkopf | 290/44 |
| 7,271,571 B2 * | 9/2007 | Ye et al. | 322/36 |
| 7,376,491 B2 * | 5/2008 | Walling et al. | 700/292 |
| 7,432,611 B2 * | 10/2008 | Stahlkopf | 290/44 |
| 7,528,496 B2 * | 5/2009 | Fortmann | 290/44 |
| 7,834,472 B2 * | 11/2010 | Rebsdorf et al. | 290/44 |
| 2005/0134120 A1 | 6/2005 | Nguyen et al. | |
| 2007/0069522 A1 | 3/2007 | Barton et al. | |
| 2007/0124025 A1 * | 5/2007 | Schram et al. | 700/287 |
| 2007/0268002 A1 * | 11/2007 | Guang et al. | 322/28 |
| 2008/0093856 A1 * | 4/2008 | Stiesdal | 290/44 |

(Continued)

FOREIGN PATENT DOCUMENTS

EP 1282774 B1 9/2003

(Continued)

OTHER PUBLICATIONS

International Search Report, Jul. 30, 2008 (3 pages).

(Continued)

*Primary Examiner* — Jared J Fureman
*Assistant Examiner* — Adi Amrany
(74) *Attorney, Agent, or Firm* — St. Onge Steward Johnston & Reens LLC

(57) ABSTRACT

A method for controlling a cluster of wind turbines connected to a utility grid includes the steps of determining the frequency of the utility grid, detecting a frequency deviation in the utility grid, and disconnecting the wind turbines at different predefined frequency values above the nominal frequency value. The invention also relates to a method for planning the strategy of a utility grid including a wind turbine cluster connected to the grid and a wind turbine cluster.

20 Claims, 5 Drawing Sheets

U.S. PATENT DOCUMENTS

| | | | | |
|---|---|---|---|---|
| 2008/0150282 A1* | 6/2008 | Rebsdorf et al. | ............... | 290/44 |
| 2008/0278000 A1* | 11/2008 | Capp et al. | ................. | 307/21 |
| 2008/0290735 A1* | 11/2008 | Corren et al. | ................. | 307/87 |
| 2009/0055030 A1* | 2/2009 | Mayor et al. | ................. | 700/287 |

FOREIGN PATENT DOCUMENTS

| | | | |
|---|---|---|---|
| EP | 1467463 | A1 | 10/2004 |
| EP | 1914419 | A1 | 4/2008 |
| EP | 1914420 | A1 | 4/2008 |
| WO | 9745908 | A1 | 12/1997 |
| WO | 03030329 | A1 | 4/2003 |

OTHER PUBLICATIONS

International Preliminary Report on Patentability, Apr. 24, 2009 (9 pages).

Jorgen Svensson, et al, Wind Farm Control Software Structure, Industrial Electrical Engineering and Automation (IEA), Lund University, Box 118, SE-221 00 Lund, Sweden, XP-002254250 (15 pages).

A. Tapia, et al, Modeling and Dynamic Regulation of a Wind Farm, CIEP, Acapulco, Mexico Oct. 15-19, 2000, XP-010527924 ( pages).

* cited by examiner

METHOD FOR CONTROLLING A CLUSTER OF WIND TURBINES CONNECTED TO A UTILITY GRID

CROSS-REFERENCE TO RELATED APPLICATIONS

The present application is a continuation of pending International patent application PCT/DK2007/000489 filed on Nov. 8, 2007 which designates the United States and claims priority from Danish patent application PA 2006 01455 filed on Nov. 8, 2006, the content of which is incorporated herein by reference.

FIELD OF THE INVENTION

The invention relates to a method for controlling a cluster of wind turbines connected to a utility grid, a method for planning the strategy of a utility grid including a wind turbine cluster connected to the grid and a wind turbine cluster.

BACKGROUND OF THE INVENTION

A standard utility grid comprises a number of power generators and consumers. The utility grid maintains a stable frequency value when power generated and consumed is in balance.

The frequency of the utility grid may rise if the consumed power suddenly drops and creates an unbalance between the power generated and consumed. Unfortunately when the frequency rises it may cause malfunction or even damage to any electrical equipment connected to it.

European patent application EP 1 467 463 A discloses a method for operating a wind farm where active power supplied to a grid is controlled in dependence of the grid frequency.

European patent EP 1 282 774 B discloses a method for operating a wind turbine during a power drop where the power delivered to the electrical network is regulated or adjusted in dependence on the network frequency of the electrical network.

A disadvantage of the mentioned prior art is that at a significant reduction of power, the wear and tear on the turbines may be critically high leading to early wear out of the turbine.

It is an object of the invention to provide technique without the above mentioned disadvantages and especially it is an object to provide technique which may be used in connection with any type of wind turbine.

SUMMARY OF THE INVENTION

The invention relates to a method for controlling a cluster of wind turbines connected to a utility grid, said method comprising the steps of:
  determining the frequency of the utility grid,
  detecting a frequency deviation in the utility grid, and
  disconnecting said wind turbines at different predefined frequency values above the nominal frequency value.

By cluster is meant more than one wind turbine in one or more wind parks, distributed in a region, area etc.

Hereby is achieved an advantageous method for controlling a wind turbine cluster during a frequency change in the utility grid in order to stabilize and minimize the frequency deviation. Furthermore it is ensured that said cluster of wind turbines support the utility grid in case of said frequency deviation.

In one embodiment of the invention said determining the frequency of the utility grid is done in each individual wind turbine in said cluster of wind turbines or is determined centrally by central control means in connection with the wind turbines.

By determining the frequency of the utility grid in each individual wind turbine it is ensured that said frequency is provided to control means in each individual wind turbine of a cluster of wind turbines without the necessity of being connected to central means for determining the frequency. It is hereby further ensured that the control means can compare said determined frequency value e.g. with a stored frequency value and control when and if the wind turbine must be disconnected from the utility grid due to a detected frequency deviation value above the nominal frequency value.

By determining the frequency of the utility grid centrally by central control means in connection with the wind turbines it is ensured that the same determined frequency value is distributed to each individual wind turbine in said cluster of wind turbines. Hereby an accurate control of the wind turbines is ensured.

In another embodiment of the invention said disconnection of wind turbines is controlled locally by local control means in each wind turbine, or is controlled centrally by central control means in connection with the wind turbines.

By controlling the disconnection of wind turbines locally it is ensured that the individual wind turbine is controlled independently of the status of a central control structure in connection with the wind turbines. It is furthermore ensured that a central control structure does not use extra computational capacity on the control of said disconnection of wind turbines but can use said capacity for other control purposes.

By controlling the disconnection of wind turbines centrally by central control means in connection with the wind turbines it is ensured that the strategy for the disconnection for said cluster of wind turbines can easily be altered accordingly.

In another embodiment of the invention the wind turbines are disconnected successively. Hereby it is ensured that grid codes are complied and that the cluster of wind turbines responses to an increase in frequency of the utility grid.

In another embodiment of the invention said central control means selects wind turbines to disconnect randomly. Hereby it is ensured that, for multiple events where the frequency of the utility grid increases, it is not the same succession of wind turbines that disconnects. By this is ensured that the tear and wear on the individual wind turbine due to disconnection is uniformly distributed between the wind turbines in the cluster of wind turbines.

In another embodiment of the invention said central control means disconnects wind turbines based on production parameters such as data about previous successions, power generated by the wind turbines in a previous and predefined time period, wear and tear values of the wind turbines etc. Hereby it is ensured that an optimal disconnection of the wind turbines in the cluster of wind turbines can be obtained taking essential parameter into account such as wear and tear parameters of the wind turbine.

In another embodiment of the invention said different predefined frequency values $f_{trip,1} \ldots f_{trip,x}$ are below an predefined upper frequency limit $f_{highlim}$ of the utility grid. Hereby it is ensured that a maximal power support of the utility grid from the cluster of wind turbines can be achieved as the frequency rises.

In another embodiment of the invention said wind turbines are disconnected successively in a predefined relation to said frequency deviation in the utility grid, such as a substantially linear relation. Hereby it is ensured that the relation between successively disconnecting wind turbines and the frequency deviation in the utility grid comply with predefined grid codes and an optimal power support of the utility grid can be achieved.

In another embodiment of the invention, said wind turbines are disconnected in a predefined relation to said frequency deviation in the utility grid in a non-linear relation such as a logarithmic relation, second-order relation or any other non-linear relation. It is hereby ensured that the relation to which the wind turbines are disconnected, comply with the demands of the grid and/or the demands of e.g. a grid operator.

In another embodiment of the invention each wind turbine includes a unique predefined frequency value defining when the wind turbine must disconnect from the utility grid. Hereby it is ensured the wind turbine disconnect when the frequency of the utility grid is equal to or above said predefined frequency value.

In another embodiment of the invention two or more wind turbines includes the same unique predefined frequency value defining when the wind turbines must disconnect from the utility grid. Hereby it is ensured that more wind turbines disconnect at the same time as the frequency of the utility grid increases whereby a greater amount of power is disconnected at the same predefined frequency.

The invention also relates to a method for planning the strategy of a utility grid including a cluster of wind turbines connected to the grid by:

defining a frequency $f_{trip,x}$ at which a wind turbine x must disconnect from the utility grid by using $$\Delta P = k \cdot P_m \frac{f_{lim} - f_{act}}{f_{ref}}$$

$$P_m = n_{turbine} \cdot P_{turbine}$$

$$z = \frac{\Delta P}{P_{turbine}}$$

$$f_{trip,x} = f_{lim} + \frac{(f_{highlim} - f_{lim})}{z}(x - 1)$$

Hereby it is ensured that the frequencies $f_{trip,x}$ are defined based on actual wind turbine cluster parameters and the progression of the frequency deviation of the utility grid.

The invention also relates to a cluster of wind turbines comprising at least two wind turbines connected to a utility grid, each of said wind turbines includes
  means for disconnecting the wind turbine when the utility grid frequency reaches a predefined frequency value,
  wherein said at least two wind turbines comprise different said predefined frequency values.

Hereby it is ensured that said cluster of wind turbines can support the utility grid during a frequency deviation of the grid.

In another embodiment of this invention each individual wind turbine comprises means for measuring the frequency of the utility grid or each individual wind turbine is connected to central control means measuring the frequency of the utility grid. Hereby it is ensured that an optimal measurement of the frequency of the utility grid can be obtained depending on the control structure of the cluster of wind turbines and/or the individual wind turbine.

In yet another embodiment of the invention, each said wind turbines comprises means for storing a predefined frequency value above nominal frequency value of the utility grid. Hereby it is ensured that the wind turbine can disconnect from the utility grid in the case of a frequency deviation above nominal even if the wind turbine is not connected to a central controller.

In a further embodiment of this invention each individual wind turbine comprises means for disconnecting the wind turbine from the utility grid or each individual wind turbine is disconnected by central control means. Hereby it is ensured that each individual wind turbine is disconnected as to support the utility grid in an optimal manner.

In an even further embodiment of the invention, two or more wind turbines comprises means for disconnecting the wind turbines at the same predefined frequency value above nominal value of the utility grid. It is hereby ensured that e.g. in clusters comprising a large number of wind turbines, more that one wind turbine can be disconnected at the same frequency with the result that as the frequency of the utility grid increases a greater amount of power is disconnected at the same predefined frequencies.

BRIEF DESCRIPTION OF THE DRAWINGS

The invention will be described in the following with reference to the figures in which.

DETAILED DESCRIPTION OF THE INVENTION

Figure 1:
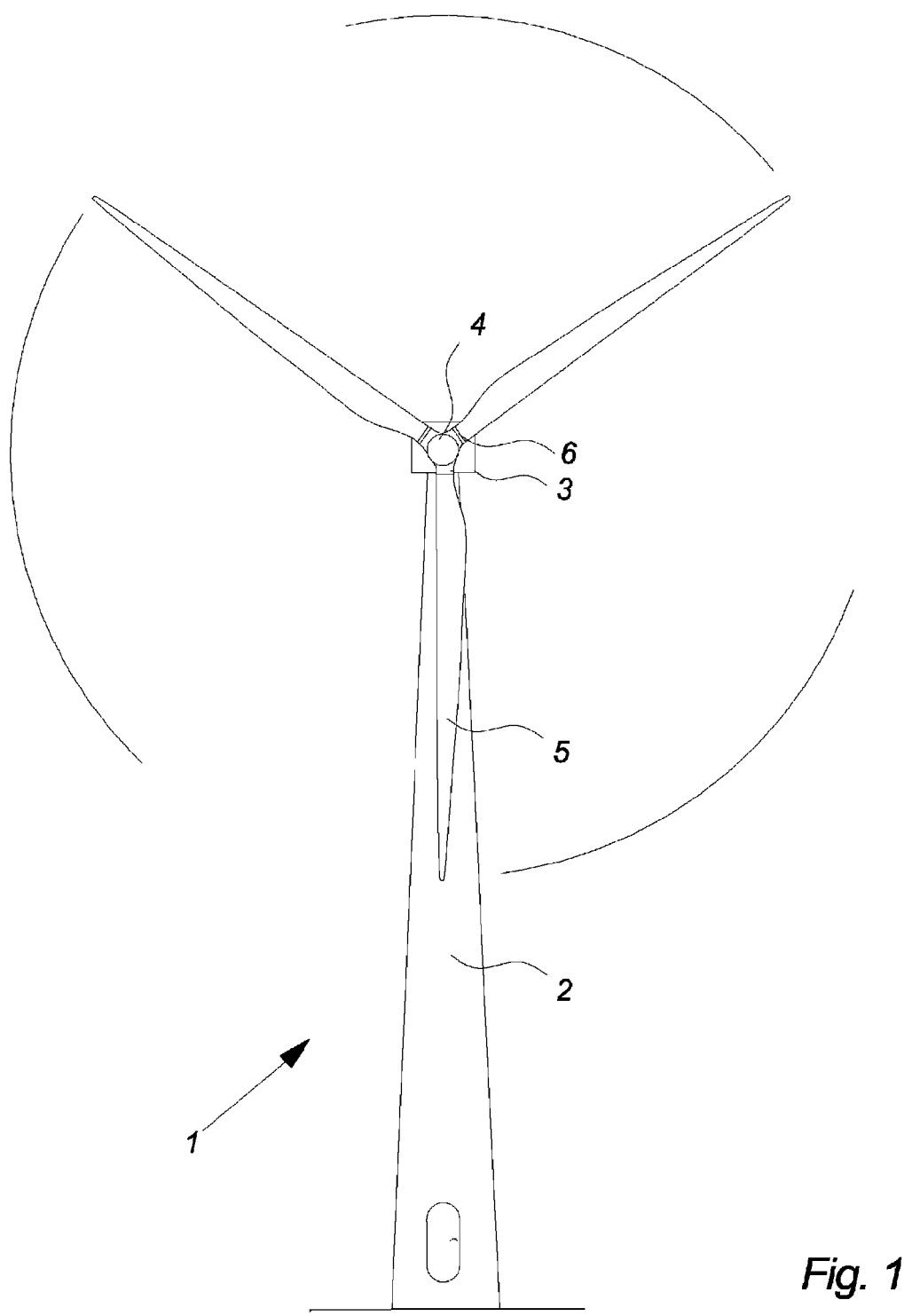
FIG. 1 illustrates a large modern wind turbine including three wind turbine blades in the wind turbine rotor.

FIG. 1 illustrates a modern wind turbine 1 with a tower 2 and a wind turbine nacelle 3 positioned on top of the tower. The wind turbine rotor, comprising at least one blade such as three wind turbine blades 5 as illustrated, is connected to the hub 4 through pitch mechanisms 6. Each pitch mechanism includes a blade bearing and pitch actuating means which allows the blade to pitch. The pitch process is controlled by a pitch controller.

It is required from grid codes that wind turbines 1 connected to a utility grid 7 contribute to frequency control during an event where the frequency of the utility grid increases. More specific the wind turbines 1 are required to reduce power generation when the frequency exceeds a predetermined level defined by grid operators.

According to the present invention said reduction in power generation is done by disconnecting individual specified wind turbines 1, 10a, 10b, . . . 10x, 12 in a cluster of wind turbines in relation to the frequency of the utility grid 7.

In one embodiment of the invention it is defined, in case of a sudden power drop event, that the cluster of wind turbines must contribute to stabilize the frequency of the utility grid 7 by a power reduction that is defined e.g. to be a linear reduction of the supplied power when the grid frequency is exceeding a predetermined value $f_{lim}$, defined by equation 1:

$$\Delta P = k \cdot P_m \frac{f_{lim} - f_{act}}{f_{ref}} \qquad [1]$$

where ΔP is the required reduction in power generation
k is constant defining the slope of the reduction
$P_m$ is the available power during normal operation
$f_{lim}$ is a predetermined lower limit frequency
$f_{highlim}$ is the upper limit frequency where the equation is valid
$f_{act}$ is the actual frequency within the grid
$f_{ref}$ is the reference frequency of the grid such as 50 or 60 Hz.

Equation 1 is valid for $f_{act}$ in the range from $f_{lim}$ to $f_{highlim}$. If $f_{act}$ increases to a value higher than or equal to $f_{highlim}$ all the wind turbines 1, 10a, 10b, ... 10x, 12 in said cluster of wind turbines must disconnect from the utility grid 7.

Furthermore for this embodiment of the invention $P_m$ is calculated as:

$$P_m = n_{turbine} \cdot P_{turbine} \quad [2]$$

where $n_{turbine}$ is the number of wind turbines 1, 10a, 10b, ... 10x, 12 in a controlled cluster of wind turbines, and
$P_{turbine}$ is the power production of one individual wind turbine.

For other embodiments of the invention $P_m$ can be defined by other parameters such as rated power, an external power reference valid for normal operation etc. and/or $P_{turbine}$ can be defined by other parameters such as rated wind turbine power, external wind turbine power reference setpoint valid for normal operation etc.

According to the present invention said reduction in power generation is done by a successive disconnection of individual specified wind turbines 1, 10a, 10b, ... 10x, 12 in relation to an increase of said frequency of the utility grid.

The number of wind turbines 1, 10a, 10b, ... 10x, 12 that needs to disconnect in order to fulfill the required reduction in power generation can be calculated from equation 3:

$$z = \frac{\Delta P}{P_{turbine}} \quad [3]$$

where z is an integer representing the number of turbines 1, 10a, 10b, ... 10x, 12 that needs to disconnect.

In one preferred embodiment of the invention wind turbines 1, 10a, 10b, ... 10x, 12 will be disconnected from the utility grid 7 successively in a linear manner as the frequency of the utility grid rises due to said reduction in power. The actual frequency at which the individual turbine 1, 10a, 10b, ... 10x, 12 for this embodiment must disconnect is calculated from equation 4:

$$f_{trip,x} = f_{lim} + \frac{(f_{highlim} - f_{lim})}{z}(x-1) \quad [4]$$

Where x is an integer in the interval from 1 to z representing the indicidual wind turbine number in a disconnection sequence.
$f_{trip,x}$ is the actual frequency at which turbine x must disconnect.

For further embodiments of the invention, wind turbines 1, 10a, 10b, ... 10x, 12 will be disconnected from the utility grid 7 successively in a non-linear manner as the frequency of the utility grid rises due to said reduction in consumed power.

Figure 2:
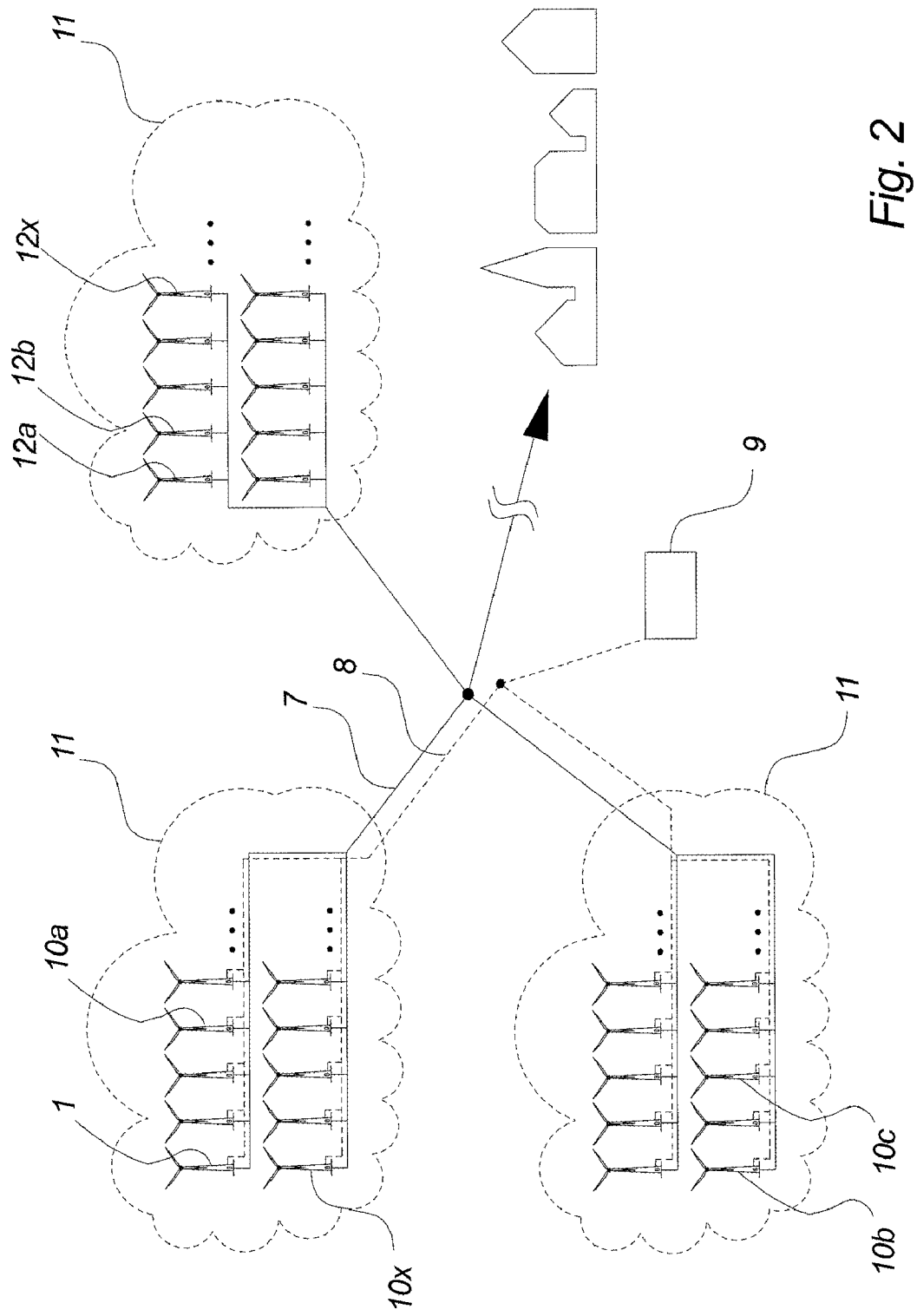
FIG. 2 illustrates schematically the electrical interconnection of one cluster of wind parks connected to a utility grid as know in the art.

FIG. 2 illustrates schematically a cluster of wind turbines 1, 10a, 10b, ... 10x, 12 connected to a distributed utility grid 7 according to one embodiment of the invention.

If a utility grid 7 experiences an increase in frequency exceeding said predetermined frequency $f_{lim}$ defined by e.g. a grid operator, a number of wind turbines 1, 10a, 10b, ... 10x, 12 must disconnect according to the invention and in relation to equations 1 to 4.

According to one embodiment of the invention each individual wind turbine 12a, 12b, ... 12x in a cluster of wind turbines is preset to disconnect from the utility grid 7 at different values of frequencies according to equation 4 i.e. said individual turbine comprise means for storing a predefined frequency value $f_{trip,x}$ and means for disconnecting the wind turbine when the utility grid frequency $f_{act}$ reaches said predefined frequency value. This embodiment does not require any external disconnection control but requires that each wind turbine 12a, 12b, ... 12x substantially continuous acquires information of the actual grid frequency ($f_{act}$) by a decentral detection.

By decentral detection is meant that substantially each wind turbine 12a, 12b, ... 12x comprise means for detecting actual grid frequency ($f_{act}$) individually.

By substantially continuously comparing acquired information about grid frequency ($f_{act}$) with a stored predefined frequency value ($f_{trip,x}$) for each individual wind turbine (x), control means in said individual wind turbine 12a, 12b, ... 12x can detect when and if the wind turbine must disconnect from and reconnect to the utility grid.

According to another embodiment of the invention each wind turbine 1, 10a, 10b, ... 10x substantially continuous acquires information of the actual grid frequency ($f_{act}$) by a central detection.

By central detection is meant frequency detection means 9 that distribute the same values of the detected actual grid frequency ($f_{act}$) to one or more wind turbines 1, 10a, 10b, ... 10x via a data communication network 8.

For another embodiment of the invention central control means 9 is present. By central control means 9 is meant means that is connected to two or more wind turbines 1, 10a, 10b, ... 10x via a data communication network 8 for the purpose of controlling one or more control parameters in said wind turbines.

For the present invention said control parameter can be a "disconnect"-command sent to the individual wind turbine 1, 10a, 10b, ... 10x with a disconnection of the turbine from the utility grid 7 as result.

In one preferred embodiment the central control means 9 is connected to and controls a plurality of wind turbines 1, 10a, 10b, ... 10x, preferred all wind turbines in a cluster of wind turbines. The central control means 9 substantially continuously achieves information about the frequency of the utility grid. This information is used to select wind turbines 1, 10a, 10b, ... 10x to disconnect from the utility grid 7.

In one embodiment of the invention, the order of wind turbines 1, 10a, 10b ... 10x to disconnect from the utility grid 7 is defined by said central control means 9 in a fixed structure. Hereby is meant that wind turbines 1, 10a, 10b, ... 10x are disconnected in the same succession for every event where the frequency of the utility grid increases.

In another embodiment of the invention, the order of wind turbines 1, 10a, 10b, ... 10x to disconnect from the utility grid 7 is defined by said central control means 9 randomly or in a predefined altering sequence. Hereby is meant that wind turbines 1, 10a, 10b, ... 10x are disconnected in a randomly chosen succession when the frequency of the utility grid increases.

In another embodiment of the invention, the order of wind turbines 1, 10a, 10b, ... 10x to disconnect from the utility grid 7 is defined by said central control means 9 in an altered chosen succession. Hereby is meant that wind turbines 1, 10a, 10b . . . 10x are disconnected in a succession defined by said central control means 9 and that said succession is altered from one event to the next when the frequency of the utility grid increases. The control of said altered succession can be based on parameters such as data about previous successions, power generated by the wind turbines 1, 10a, 10b, . . . 10x in a previous and predefined time period, load and/or wear and tear values of the wind turbines 1, 10a, 10b, . . . 10x etc.

Figure 3A:
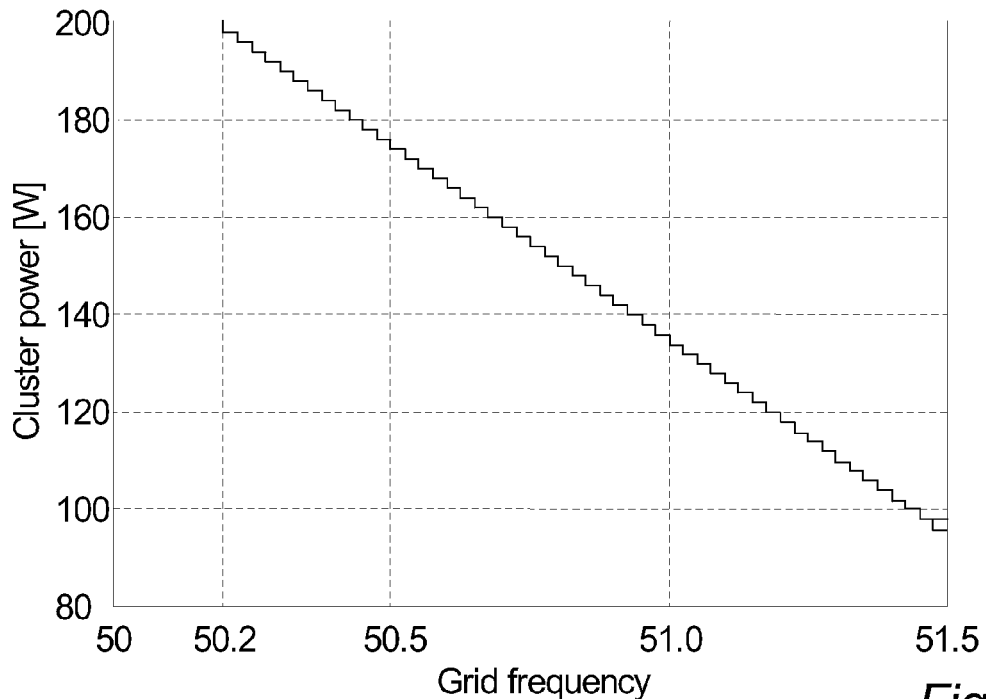
FIG. 3 illustrates the power vs. frequency curve for one embodiment of the invention.

FIG. 3a illustrates for one embodiment of the invention an example illustrating the response from a cluster of wind turbines comprising 100 wind turbines due to a rise in the grid frequency to 51.5 Hz. For this example it is defined that if the grid frequency increases above a certain frequency ($f_{lim}$) the generated power is required to be reduced according to equation 1 to 4 up to a frequency of $f_{highlim}$.

For the illustrated example following parameters are used:
k=20 (i.e. a 40% reduction per Hz for a 50 Hz grid)
$f_{act}$=50.0 Hz to 51.5 Hz
$f_{lim}$=50.2 Hz
$f_{highlim}$=51.5 Hz
$f_{ref}$=50 Hz.
$n_{turbine}$=100
$P_{turbine}$=2 MW
ΔP=104 MW (according to equation 1)
$P_m$=200 MW (according to equation 2)
z=52 (according to equation 3)

As it can be seen from FIG. 3a wind turbines 1, 10a, 10b, . . . 10x are successively disconnected as the grid frequency increases above $f_{lim}$ (50.2 Hz). The frequency at which each individual wind turbine 1, 10a, 10b, . . . 10x disconnects is defined by equation 4. For this example a wind turbine 1, 10a, 10b, . . . 10x is disconnected successively for each frequency increase step of 0.025 Hz.

Figure 3B:
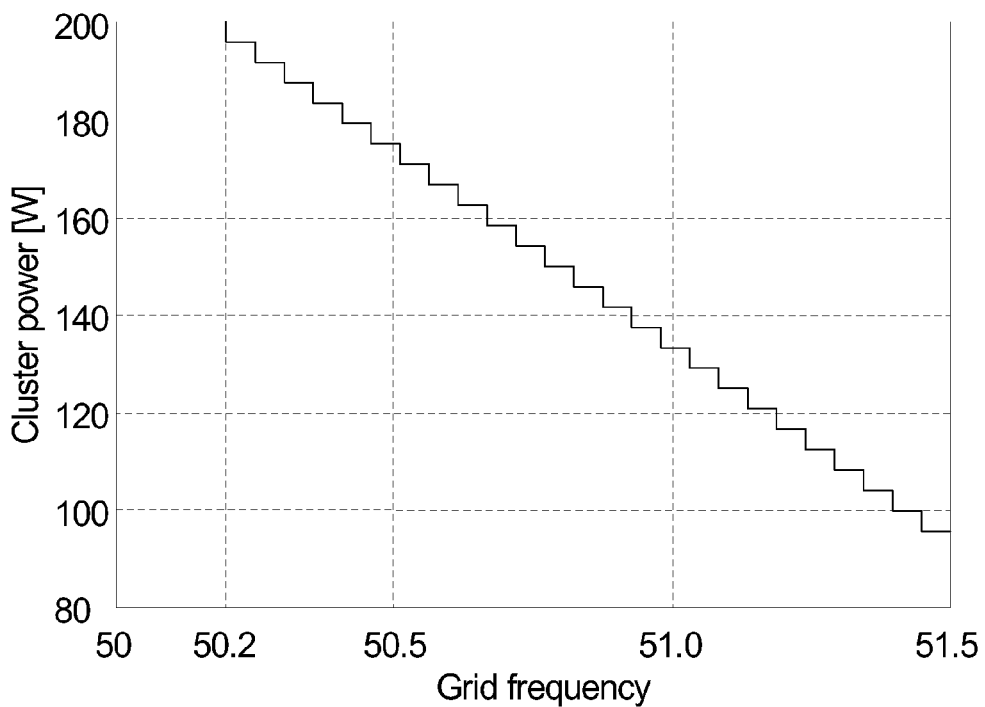

FIG. 3b illustrates for another embodiment of the invention an example illustrating the response from a cluster of wind turbines comprising 48 wind turbines 1, 10a, 10b, . . . 10x i.e. $n_{turbine}$=48. The same control parameters as in FIG. 3a are used. For this example a wind turbine 1, 10a, 10b, . . . 10x is disconnected successively as the frequency increases 0.052 Hz.

Figure 4:
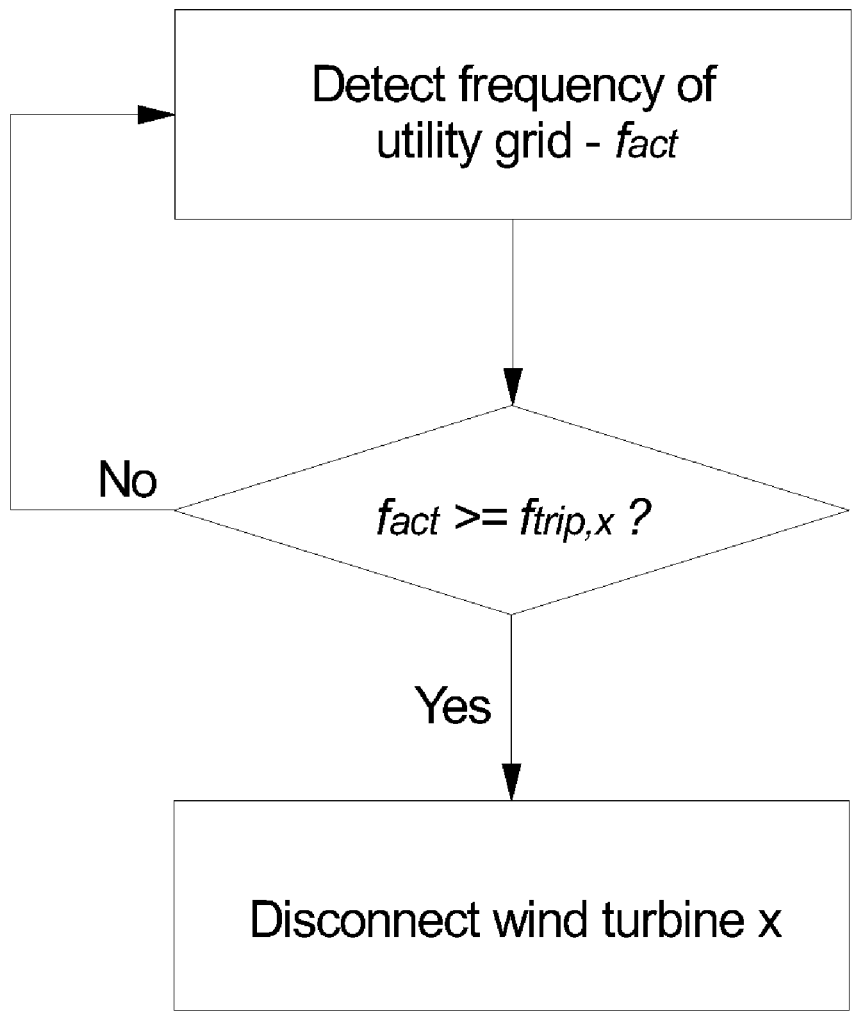
FIG. 4 illustrates schematically a control diagram for one embodiment of the invention.

FIG. 4 illustrates schematically a control diagram for one embodiment of the invention where the detection of the frequency of the utility grid is done in each individual wind turbine 12a, 12b, . . . 12x.

If the detected frequency $f_{act}$ is higher than or equal to its stored predefined frequency value $f_{trip,x}$ above the nominal frequency value of the utility grid, the control means in the wind turbine 12a, 12b, . . . 12x will disconnect it from the utility grid 7.

Figure 5:
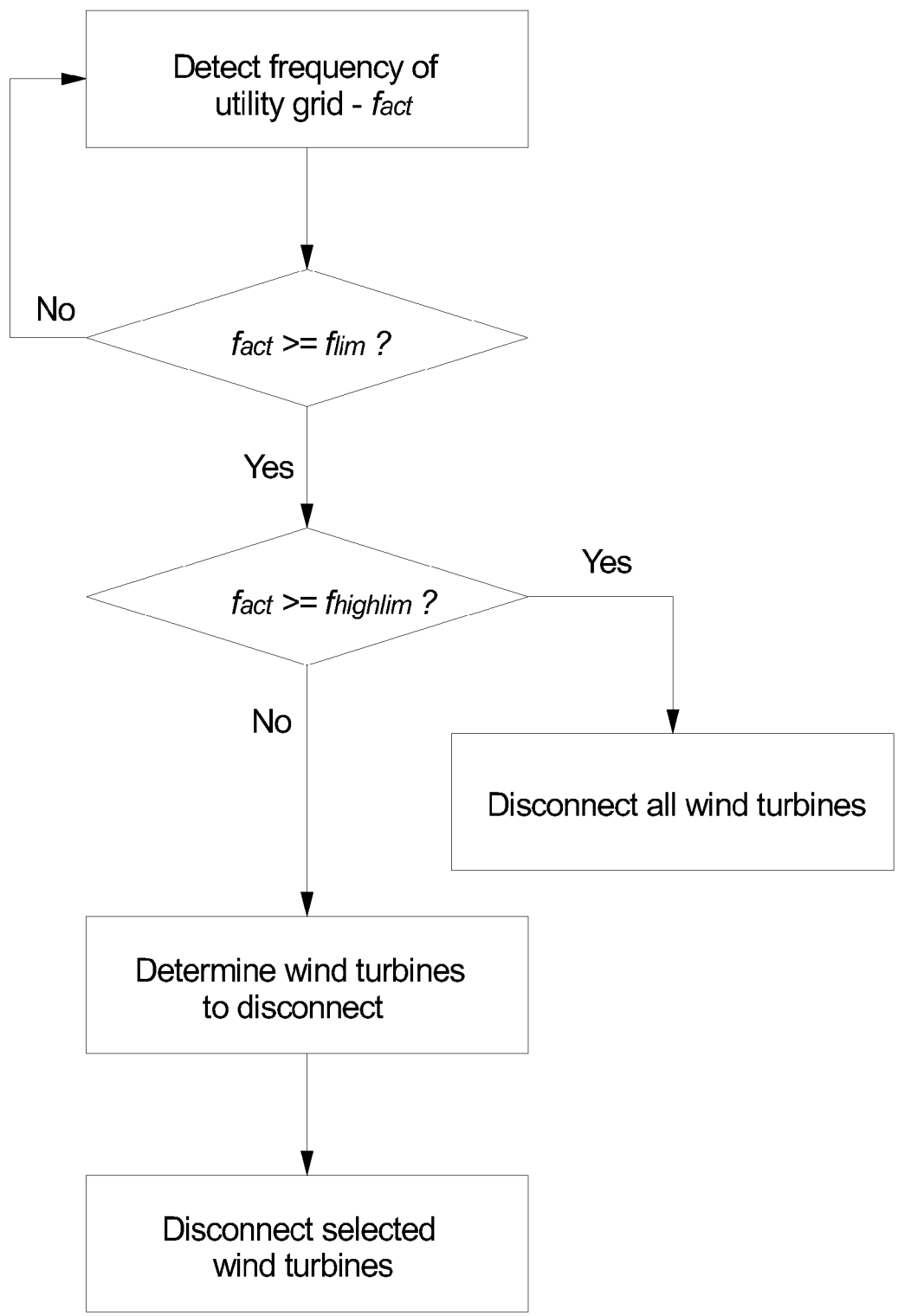
FIG. 5 illustrates schematically a control diagram for another embodiment of the invention.

FIG. 5 illustrates schematically a control diagram for another embodiment of the invention where the detecting of the frequency of the utility grid is done centrally by detection means 9 and the disconnection of the wind turbines 1, 10a, 10b, . . . 10x is controlled centrally by control means 9 in connection with the wind turbines 1, 10a, 10b, . . . 10x.

In various embodiments of the invention, especially related to but not restricted to, clusters comprising a large number of wind turbines, more that one wind turbine can be disconnected at the same frequencies.

What is claimed is:

1. A method for controlling individual wind turbines in a cluster of wind turbines connected to a utility grid, said method comprising the steps of:
   calculating a plurality of limit frequency values above a nominal frequency at which a plurality of wind turbines are to disconnect,
   determining an actual frequency of the utility grid, including a frequency deviation in the utility grid, and
   successively disconnecting two or more of the plurality of wind turbines, wherein each wind turbine is disconnected when the actual frequency is at the limit frequency value of the wind turbine.

2. The method for controlling a cluster of wind turbines according to claim 1, wherein determining the actual frequency of the utility grid is done in each individual wind turbine in said cluster of wind turbines.

3. The method for controlling a cluster of wind turbines according to claim 1, wherein the disconnection of wind turbines is controlled locally by local control means in each wind turbine.

4. The method for controlling a cluster of wind turbines according to claim 1, wherein the calculated plurality of limit frequency values $f_{trip,1}$ . . . $f_{trip,x}$ are below a predefined upper frequency limit $f_{highlim}$ of the utility grid, wherein when the determined actual frequency of the utility grid is above the predefined upper frequency limit $f_{highlim}$, all the wind turbines in the wind cluster are disconnected.

5. The method for controlling a cluster of wind turbines according to claim 1, wherein the wind turbines are disconnected successively in a linear relation to the frequency deviation in the utility grid.

6. The method for controlling a cluster of wind turbines according to claim 1, wherein the wind turbines are disconnected in a non-linear relation to the frequency deviation in the utility grid.

7. The method for controlling a cluster of wind turbines according to claim 1, wherein determining the actual frequency of the utility grid is determined mined centrally by a central control unit in connection with the wind turbines.

8. The method for controlling a cluster of wind turbines according to claim 7, wherein the central control unit selects wind turbines to disconnect randomly.

9. The method for controlling a cluster of wind turbines according to claim 7, wherein the central control unit disconnects wind turbines based on production parameters.

10. The method for controlling a cluster of wind turbines according to claim 1, wherein the disconnection of wind turbines is controlled centrally by the central unit in connection with the wind turbines.

11. A wind turbine cluster comprising at least two individual wind turbines connected to a utility grid, comprising at least one control means having
   calculation means being adapted for calculating a plurality of limit frequency values above a nominal frequency at which a plurality of wind turbines are to disconnect,
   determination means for determining an actual frequency of the utility grid, including a frequency deviation in the utility grid, and
   disconnecting means prepared for successively disconnecting a plurality of the individual wind turbines so that each of the individual wind turbines are disconnected when the actual frequency is at the limit frequency value of the wind turbine.

12. The wind turbine cluster according to claim 11, wherein each individual wind turbine comprises means for measuring the actual frequency of the utility grid.

13. The wind turbine cluster according to claim 11, wherein each of the wind turbines comprises means for storing a calculated limit frequency value above the nominal frequency value of the utility grid.

14. The wind turbine cluster according to claim 11, wherein each individual wind turbine comprises means for disconnecting the wind turbine from the utility grid.

15. The wind turbine cluster according to claim 11, wherein each wind turbine comprises means for disconnecting the wind turbine at one of the calculated limit frequency values above nominal value of the utility grid.

16. The wind turbine cluster according to claim 11, wherein each individual wind turbine is connected to a central control unit measuring the frequency of the utility grid.

17. The wind turbine cluster according to claim 16, wherein each individual wind turbine is disconnected from the utility grid by the central control unit.

18. The wind turbine cluster according to claim 11, wherein the calculated plurality of limit frequency values $f_{trip,1} \ldots f_{trip,x}$ are below a predefined upper frequency limit $f_{highlim}$ of the utility grid, wherein when the determined actual frequency of the utility grid is above the predefined upper frequency limit $f_{highlim}$, all the wind turbines in the wind cluster are disconnected.

19. The wind turbine cluster according to claim 11, wherein the wind turbines are disconnected successively in a linear relation to the frequency deviation in the utility grid.

20. The wind turbine cluster according to claim 11, wherein the wind turbines are disconnected in a non-linear relation to the frequency deviation in the utility grid.

* * * * *